(12) United States Patent
Ishii et al.

(10) Patent No.: US 11,919,455 B2
(45) Date of Patent: Mar. 5, 2024

(54) TRUNK STRUCTURE FOR VEHICLE

(71) Applicant: MAZDA MOTOR CORPORATION, Hiroshima (JP)

(72) Inventors: Shinji Ishii, Hiroshima (JP); Keita Miyamoto, Hiroshima (JP); Takafumi Kawaura, Hiroshima (JP); Shumpei Kuwamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 184 days.

(21) Appl. No.: 17/695,531

(22) Filed: Mar. 15, 2022

(65) Prior Publication Data

US 2022/0340091 A1 Oct. 27, 2022

(30) Foreign Application Priority Data

Apr. 22, 2021 (JP) .................. 2021-072557

(51) Int. Cl.
*B60R 13/01* (2006.01)
*B60R 5/04* (2006.01)
*B60R 7/02* (2006.01)
*B60R 11/00* (2006.01)

(52) U.S. Cl.
CPC .............. *B60R 13/011* (2013.01); *B60R 5/04* (2013.01); *B60R 5/045* (2013.01); *B60R 7/02* (2013.01); *B60R 13/013* (2013.01); *B60R 2011/0036* (2013.01)

(58) Field of Classification Search
CPC .......... B60R 5/045; B60R 5/044; B60R 5/04; B60R 7/02; B60R 7/005; B60R 13/011; B60R 2011/0036; B60R 13/013; B60R 2013/016; B60R 2013/018

USPC ..................................... 296/37.16
See application file for complete search history.

(56) References Cited

U.S. PATENT DOCUMENTS

| 4,907,921 A | * | 3/1990 | Akright ............... | B61D 45/001 |
| | | | | 410/111 |
| 5,052,869 A | * | 10/1991 | Hansen, II ............ | B60P 7/0807 |
| | | | | 410/101 |
| 5,387,064 A | * | 2/1995 | Cardinal ............. | B62D 33/042 |
| | | | | 414/679 |

(Continued)

FOREIGN PATENT DOCUMENTS

| JP | 4857908 B2 * | 1/2012 |
| JP | 2012-035767 A | 2/2012 |

*Primary Examiner* — Jason S Morrow
(74) *Attorney, Agent, or Firm* — Studebaker & Brackett PC

(57) ABSTRACT

A trunk structure for a vehicle improves retainment performance of goods to a vehicle body in a cargo net, and improves flexibility of the layout of a trunk board. The trunk structure includes a trunk board, a hook member attached to the trunk board to which a cargo net covering goods can be locked, an interior member which constitutes an inside surface of a trunk, and an engaged portion of the interior member which the hook member can engage, the engaged portion restraining movement of the trunk board in an up-down direction when the engaged portion is engaged with the hook member. The hook member is switchable between an engaged state where the hook member engages the engaged portion and a non-engaged state where the engagement is released, and retains the engaged state by locking the cargo net to the hook member.

16 Claims, 13 Drawing Sheets

(56) References Cited

U.S. PATENT DOCUMENTS

| | | | | |
|---|---|---|---|---|
| 5,924,611 | A * | 7/1999 | Mizuno | B60R 7/005 |
| | | | | 224/543 |
| 6,439,633 | B2 * | 8/2002 | Nemoto | B60R 7/02 |
| | | | | 410/97 |
| 8,490,935 | B2 * | 7/2013 | Myers | B60R 7/10 |
| | | | | 248/289.11 |
| 9,238,438 | B1 * | 1/2016 | Valencia Cruz | B60R 5/045 |
| 9,283,896 | B2 * | 3/2016 | Murru | B60R 5/04 |
| 9,340,143 | B2 * | 5/2016 | Stakoe | B60P 7/0876 |
| 9,511,801 | B2 * | 12/2016 | Murray | B60R 5/04 |
| 9,914,399 | B2 * | 3/2018 | Lewis | B60R 5/04 |
| 10,399,501 | B2 * | 9/2019 | Flores Marin | B60R 7/02 |
| 10,576,869 | B2 * | 3/2020 | Villacres Mesias | B60R 7/04 |
| 10,647,268 | B2 * | 5/2020 | Kato | B60R 5/045 |
| 10,682,945 | B2 * | 6/2020 | Riedel | B60R 5/04 |
| 10,752,155 | B2 * | 8/2020 | Johnson | B60P 3/07 |
| 10,940,743 | B2 * | 3/2021 | Aubrey | B60P 7/06 |
| 11,229,263 | B2 * | 1/2022 | Cho | F16B 5/10 |
| 11,458,903 | B2 * | 10/2022 | Anaya | B60R 5/04 |
| 11,654,833 | B2 * | 5/2023 | Durkin | B60R 7/10 |
| | | | | 224/543 |
| 2018/0339661 | A1 * | 11/2018 | Sotome | F16B 45/002 |
| 2022/0348144 | A1 * | 11/2022 | Nishimura | B60R 7/005 |
| 2023/0089761 | A1 * | 3/2023 | Ziolek | B60R 5/045 |
| | | | | 296/37.1 |
| 2023/0234483 | A1 * | 7/2023 | Large | B60N 2/3097 |
| | | | | 296/65.03 |

* cited by examiner

TRUNK STRUCTURE FOR VEHICLE

TECHNICAL FIELD

The present disclosure relates to a trunk structure for a vehicle.

BACKGROUND

Conventionally, in a case where goods are put in a trunk of a vehicle, a cargo net has been in general used to prevent the goods from moving during vehicle traveling.

A trunk structure described in Japanese Patent Laid-Open No. 2012-35767 includes a trunk board disposed above a floor panel of the trunk, and the trunk board is provided with a locked portion which is provided in a periphery of a cargo net and to which a hook is capable of being locked. In this trunk structure, the hook of the cargo net is locked to the locked portion of the trunk board in a state where goods placed on the trunk board are covered from above by the cargo net, and movement of the goods during vehicle traveling is thereby prevented.

SUMMARY

In a trunk structure described in above Japanese Patent Laid-Open No. 2012-35767, a hook on a cargo net side is locked to a locked portion of a trunk board, and goods are fixed to the trunk board. However, in a case where a vehicle travels on a road surface or the like with a large level difference, the goods and the trunk board integrally vibrate. Thus, there is concern that abnormal noise occurs in a vehicle cabin due to contact between the trunk board and an interior member covering an inside surface of a trunk and further the interior member is damaged due to contact with the trunk board.

Note that in recent years, in order to improve convenience of a trunk, various trunk structures have been suggested such as a reversible structure in which both a front face and a back face of a trunk board are made usable and a trunk structure in which the height of a trunk board is changeable, and an improvement in flexibility of layout of a trunk board has also been demanded.

The present disclosure has been made to solve the above problems, and provides a trunk structure for a vehicle which is capable of achieving both an improvement in retainment performance of goods to a vehicle body in a cargo net using state and an improvement in flexibility of layout of a trunk board which conforms with a purpose of use of a trunk.

To solve the above problems, a trunk structure for a vehicle of the present disclosure includes a trunk board which is disposed above a floor panel constituting a floor surface of a trunk and on which goods are capable of being mounted; a hook member which is attached to the trunk board and to which a cargo net covering the goods is capable of being locked; an interior member which constitutes an inside surface of the trunk; and an engaged portion which is provided to the interior member and with which the hook member is capable of engaging, the engaged portion restraining movement of the trunk board in an up-down direction in a state where the engaged portion is engaged with the hook member and is characterized in that the hook member is capable of being switched between an engaged state where the hook member engages with the engaged portion and a non-engaged state where the engagement is released and retains the engaged state by locking the cargo net to the hook member.

With such a configuration, the hook member attached to the trunk board is capable of being switched between the engaged state where the hook member engages with the engaged portion which is provided to the interior member constituting the inside surface of the trunk and the non-engaged state where the engagement is released. The cargo net covering the goods is locked to the hook member, and the hook member thereby retains the engaged state. This engaged state is retained, and it is thereby possible to restrain movement of the trunk board in the up-down direction. In this configuration, because a state is set where both the trunk board and the goods are fixed to the interior member by the hook member, it is possible to inhibit the goods and the truck board from moving due to vibration in vehicle traveling.

Further, the trunk board is not bound to the interior member in the non-engaged state where engagement between the hook member and the engaged portion is released, and changes in arrangement can freely be made such as flipping between front and back sides and changes in a height position. Thus, it is possible to improve flexibility of layout of the trunk board which conforms with a purpose of use of the trunk.

In the above trunk structure for a vehicle, the hook member preferably has a net locking portion to which the cargo net is locked and an engaging portion which engages with the engaged portion on a side of the interior member.

With such a configuration, when the engaging portion engages with the engaged portion, the state of the hook member thereby transits to the engaged state, and the cargo net covering the goods is locked to the net locking portion of the hook member, the hook member retains the engaged state and is thereby capable of restraining movement of the trunk board in the up-down direction.

The above trunk structure for a vehicle preferably further includes a first support portion which supports the trunk board and a second support portion which supports the trunk board in a position below the first support portion, the first support portion and the second support portion being provided to the interior member, and the engaged portion is preferably provided to each of the first support portion and the second support portion.

With such a configuration, even in a state where the trunk board is supported by either one of the first support portion and the second support portion, it is possible to engage the hook member on the trunk board side with the engaged portion and possible to fix the trunk board and the goods to the interior member.

In the above trunk structure for a vehicle, preferably, an opening which passes through the trunk board from a front face to a back face is formed in the trunk board, and the hook member is disposed to be capable of being switched between the engaged state and the non-engaged state in an internal portion of the opening, projects from both faces of the front face and the back face of the trunk board in the engaged state, and is capable of engaging with the engaged portion by a portion projecting from the trunk board.

With such a configuration, in the internal portion of the opening which passes through the trunk board from the front face to the back face, the hook member is attached to be capable of being switched between the engaged state and the non-engaged state. The hook member projects from both faces of the front face and the back face of the trunk board in the engaged state and is capable of engaging with the engaged portion by the portion projecting from the trunk board. Accordingly, even when the trunk board is used while either one of the front face and the back face is directed upward, it is possible to lock the cargo net to the hook member from an upper side of the trunk board.

In the above trunk structure for a vehicle, the hook member is preferably capable of being switched between the engaged state and the non-engaged state by being rotatably attached to the trunk board.

With such a configuration, the hook member is rotatably attached to the trunk board and is capable of being switched between the engaged state and the non-engaged state by rotation of the hook member. Consequently, a configuration of a support portion for the hook member becomes simple, and it is possible to easily perform an operation to switch the state of the hook member between the non-engaged state and the engaged state.

In the above trunk structure for a vehicle, the hook member is preferably attached to the trunk board such that transition is performed from the non-engaged state to the engaged state when the cargo net is locked.

With such a configuration, because the state of the hook member transits from the non-engaged state to the engaged state when the cargo net is locked, a manual operation for performing transition of the state of the hook member from the non-engaged state to the engaged state is not necessary.

A trunk structure for a vehicle of the present disclosure can achieve both an improvement in retainment performance of goods to a vehicle body in a cargo net using state and an improvement in flexibility of layout of a trunk board which conforms with a purpose of use of a trunk.

DETAILED DESCRIPTION

One preferable embodiment of the present disclosure will hereinafter be described in detail with reference to the attached drawings.

Figure 1:
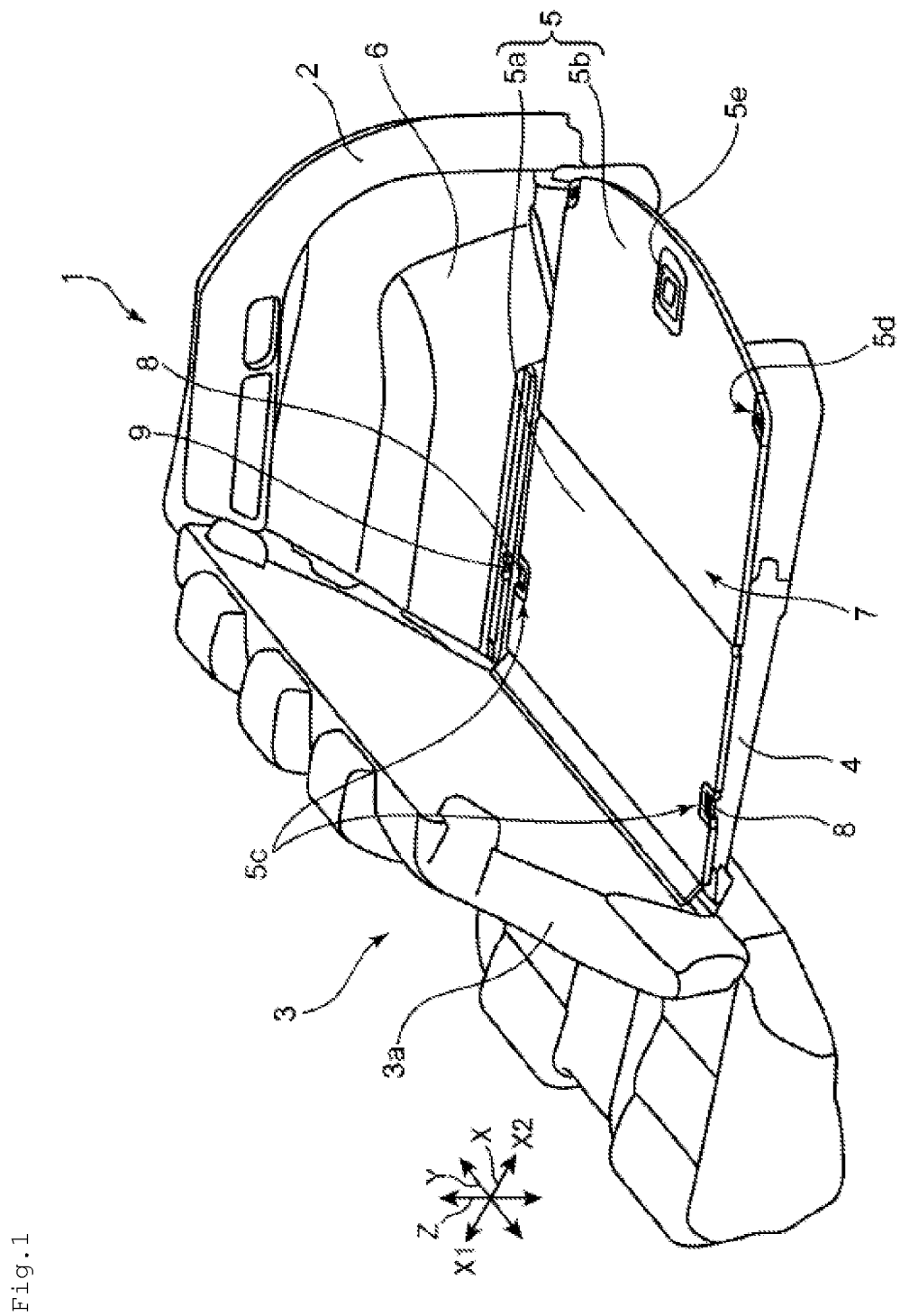
FIG. 1 is a perspective explanatory view schematically illustrating a configuration of a trunk structure for a vehicle according to an embodiment of the present disclosure.

As illustrated in FIG. 1, a trunk 7 of a vehicle 1 to which a trunk structure of the present embodiment is applied is a space having an extent for housing goods and is formed in a rear portion of the vehicle 1, for example. Specifically, the trunk 7 is formed with a seat back 3*a* (backrest), which is inclined slightly rearward, of a rear seat 3, one pair of interior members 6 which are fixed to side panels 2 on both sides of the vehicle 1 in a vehicle width direction Y, a floor panel 4 which constitutes a floor surface of the trunk 7, and a back door (not illustrated) at a back end of the vehicle 1. Note that in FIG. 7, in order to make an internal portion of the trunk 7 easily seen, the side panel 2, the interior member 6, and the back door on a front side of the page of FIG. 1 are omitted.

Figure 2:
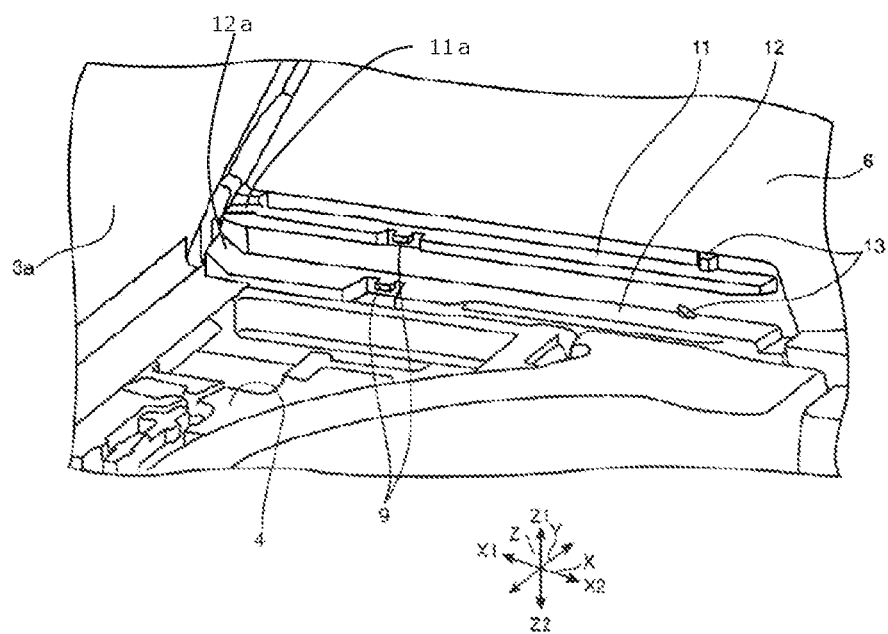
FIG. 2 is an enlarged perspective view illustrating a first support portion and a second support portion which are provided to an interior member constituting an inside surface of a vehicle cabin in FIG. 1 and respective engaged portions provided to the support portions.
Figure 3:
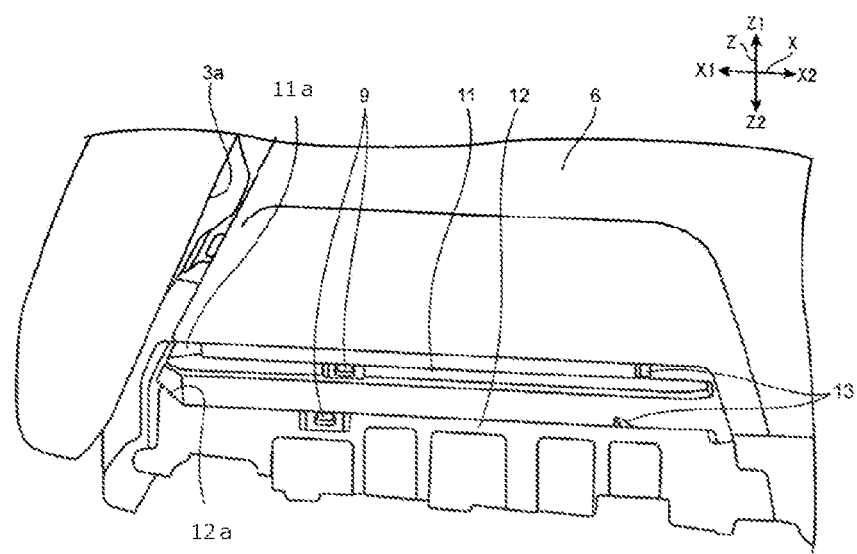
FIG. 3 is a front view illustrating the first support portion and the second support portion in FIG. 2 and the respective engaged portions provided to the support portions.

A trunk structure illustrated in FIGS. 1 to 3 includes, as principal configurations of the present disclosure, the above-described pair of interior members 6, a trunk board 5 which is disposed above the floor panel 4 and on which goods are capable of being mounted, one pair of hook members 8 which are attached to side ends of the trunk board 5 on both sides in the vehicle width direction Y, and engaged portions 9 which are respectively provided to the pair of interior members 6 and with which the hook members 8 are capable of engaging.

As illustrated in FIGS. 2 and 3, the interior member 6 constitutes an inside surface of the trunk 7 and is made up of decorative members (trims) formed of resin or the like. The interior member 6 is provided with at least one support portion which supports the trunk board 5. Specifically, the interior member 6 is provided with a first support portion 11 which supports a side edge of the trunk board 5 in the vehicle width direction Y from below and a second support portion 12 which supports the side edge of the trunk board 5 in a position of Z2 below the first support portion 11 from below.

The first support portion 11 and the second support portion 12 have shapes which are capable of supporting the side edge of the trunk board 5 in the vehicle width direction Y from below. That is, the first support portion 11 and the second support portion 12 are rail-shaped portions which extend in a vehicle front-rear direction in positions spaced apart in an up-down direction Z and project from an inside surface of the interior member 6 toward a vehicle center in the vehicle width direction Y. Accordingly, the side edge of the trunk board 5 in the vehicle width direction Y is placed on the first support portion 11 and the second support portion 12, and the trunk board 5 is capable of being supported from below.

As illustrated in FIG. 3, an end portion, on a vehicle front side X1, of the first support portion 11 on an upper stage has an inclined surface 11a of which front portion is positioned lower, that is, which is inclined in a downward direction toward vehicle front X1. Meanwhile, an end portion, on the vehicle front side X1, of the second support portion 12 on a lower stage has an inclined surface 12a of which front portion is positioned higher, that is, which is inclined in an upward direction toward the vehicle front X1.

Further, in vicinity portions of respective end portions of the first support portion 11 and the second support portion 12 on a vehicle rear side X2, projections 13 are provided which restrain movement of the trunk board 5 in a vehicle front-rear direction X.

The engaged portions 9 are respectively provided to the first support portion 11 and the second support portion 12 in rail shapes. Specifically, each of the engaged portions 9 is provided in a position where the hook member 8 provided to the trunk board 5 is capable of engaging with the engaged portion 9 in a state where the side edge of the trunk board 5 is supported from below by either one of the first support portion 11 and the second support portion 12. More specifically, the engaged portion 9 provided to the first support portion 11 on the upper stage is disposed in a position, which is offset to the vehicle rear side X2 relative to the engaged portion 9 provided to the second support portion 12 on the lower stage, so as to correspond to an inclination angle of the seat back 3a which is inclined rearward.

The engaged portion 9 of the present embodiment is made up of a projection that is disposed in a position which is isolated in a halfway portion of each of the first support portion 11 and the second support portion 12 which extend in the vehicle front-rear direction X and are in rail shapes and that projects from the inside surface of the interior member 6 toward the vehicle center in the vehicle width direction Y.

Figure 4:
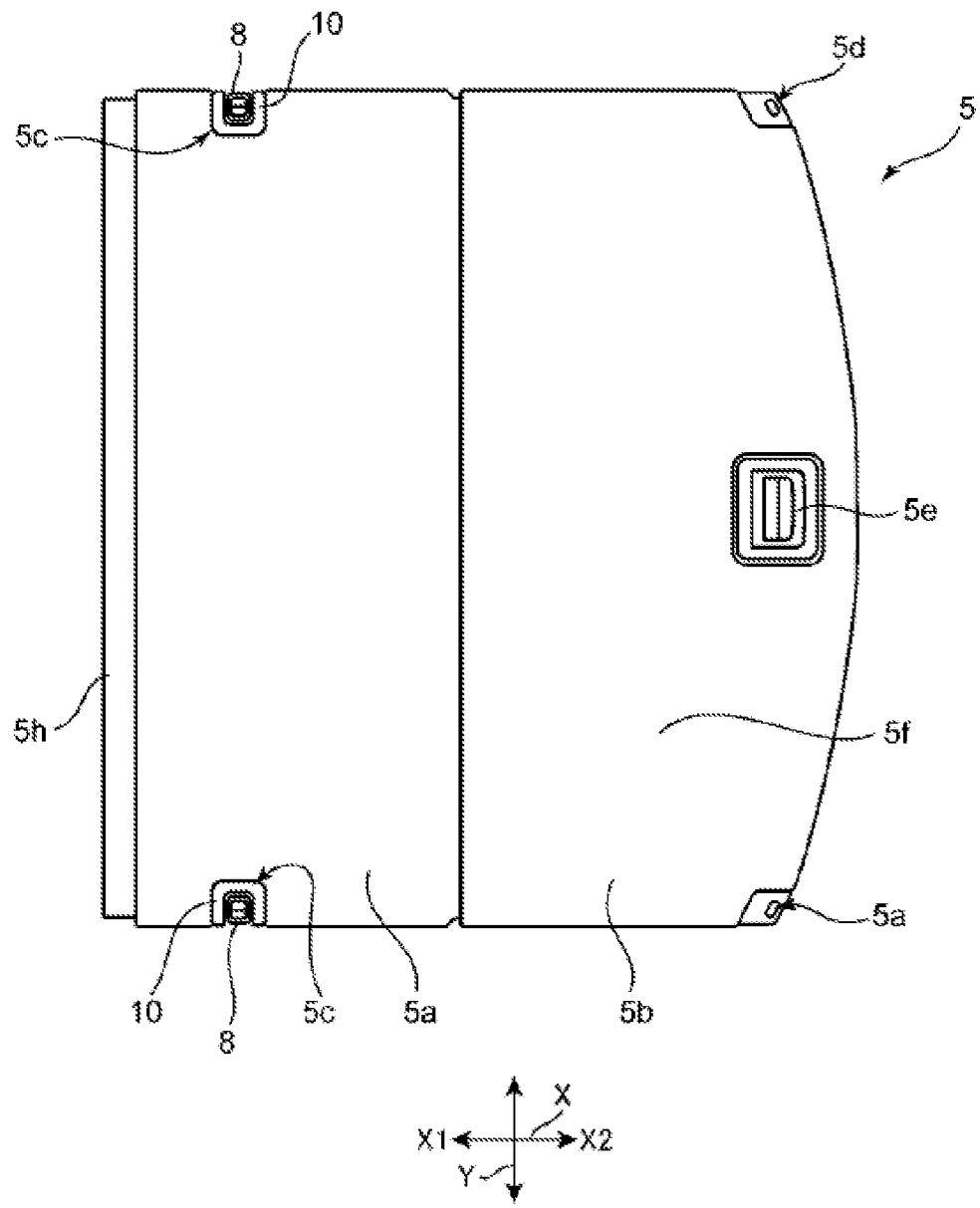
FIG. 4 is a plan view of a trunk board in FIG. 1.
Figure 5:
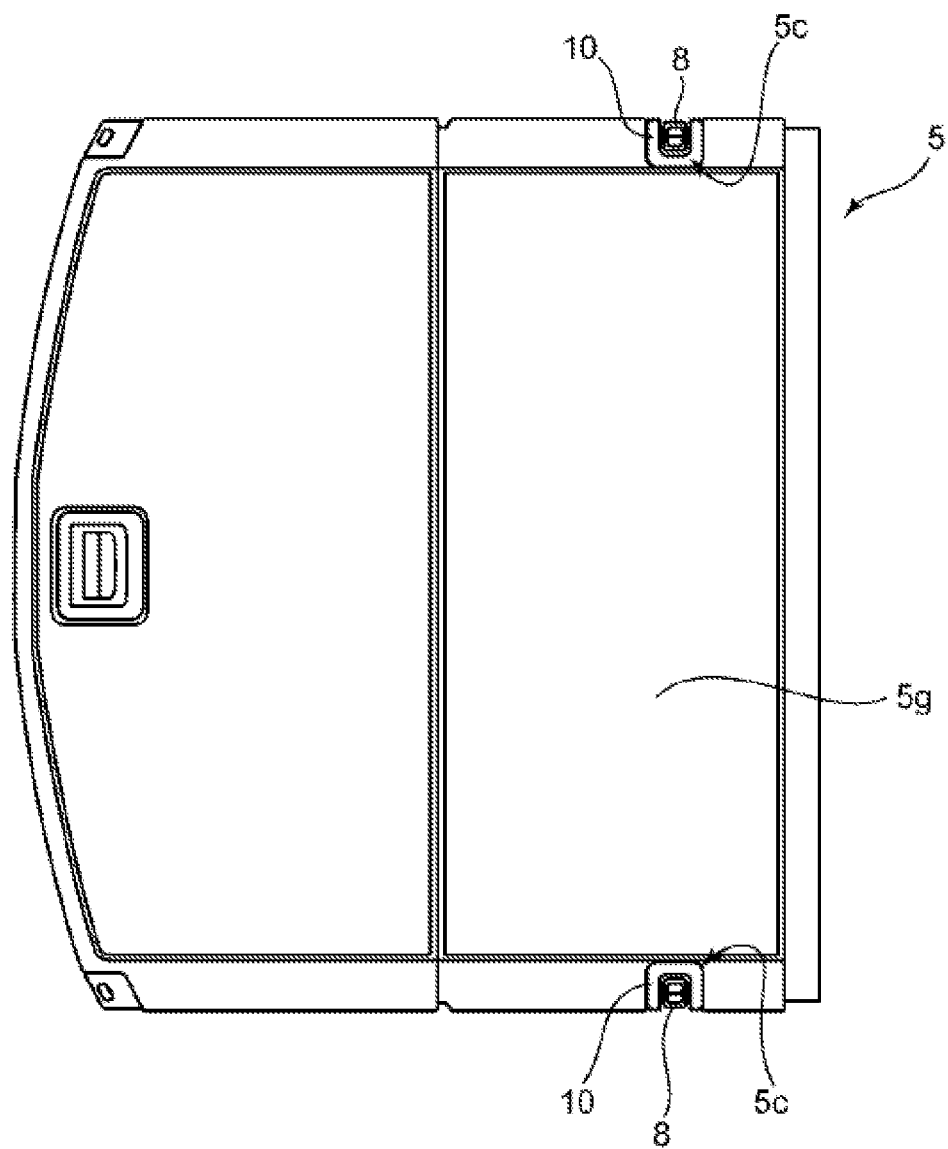
FIG. 5 is a back view of the trunk board in FIG. 1.

As illustrated in FIG. 1 and FIGS. 4 to 5, the trunk board 5 has a front-side portion 5a and a rear-side portion 5b which are divided in the vehicle front-rear direction X. A front face 5f and a back face 5g of the trunk board 5 are formed of different materials, for example, the front face 5f is formed of a nonwoven fabric, and the back face 5g is formed of a material such as a highly waterproof resin.

In both side ends of the front-side portion 5a in the vehicle width direction Y, openings 5c are formed which pass through the trunk board 5 from the front face 5f to the back face 5g. In the present embodiment, the opening 5c opens outward in the vehicle width direction Y from the side end of the front-side portion 5a in the vehicle width direction Y, and the hook member 8 disposed in an internal portion of the opening 5c is easily picked up (easily accessed) by a finger of a worker. Note that the opening 5c may be closed against the outside in the vehicle width direction Y at the side end of the front-side portion 5a in the vehicle width direction Y.

In the present embodiment, a generally U-shaped frame member 10 is attached to an inner periphery of the opening 5c. The hook member 8 is rotatably attached to the frame member 10. That is, the hook member 8 is attached to the trunk board 5 via the frame member 10. The frame member 10 has an engaging projection 10a capable of engaging with an engaging portion 8d, which will be described later, of the hook member 8 in order to retain the hook member 8 in a non-engaged state (a state where the hook member 8 is positioned on generally the same plane as the trunk board 5).

To an end portion of the front-side portion 5a on the vehicle front side X1, a thin-plate-shaped flap 5h is provided which is attached to be swingable in the up-down direction Z with respect to the front-side portion 5a. The flap 5h is disposed along the inclined surface 11a of the first support portion 11 or the inclined surface 12a of the second support portion 12, the first support portion 11 and the second support portion 12 being illustrated in FIG. 3, and is thereby capable of making smaller a gap between the front-side portion 5a and the seat back 3a (see FIGS. 8 to 12).

A handle 5e is attached to an intermediate position in the vehicle width direction Y, which is in the vicinity of an end portion of the rear-side portion 5b on the vehicle rear side X2, and a lower space of the trunk board 5 is easily opened by lifting upward the rear-side portion 5b by using the handle 5e. In addition, at both side ends of the rear-side portion 5b in the vehicle width direction Y on the vehicle rear side X2, positioning holes 5d are formed which fit to projections (not illustrated) provided to the floor panel 4 and thereby position the rear-side portion 5b.

Figure 6:
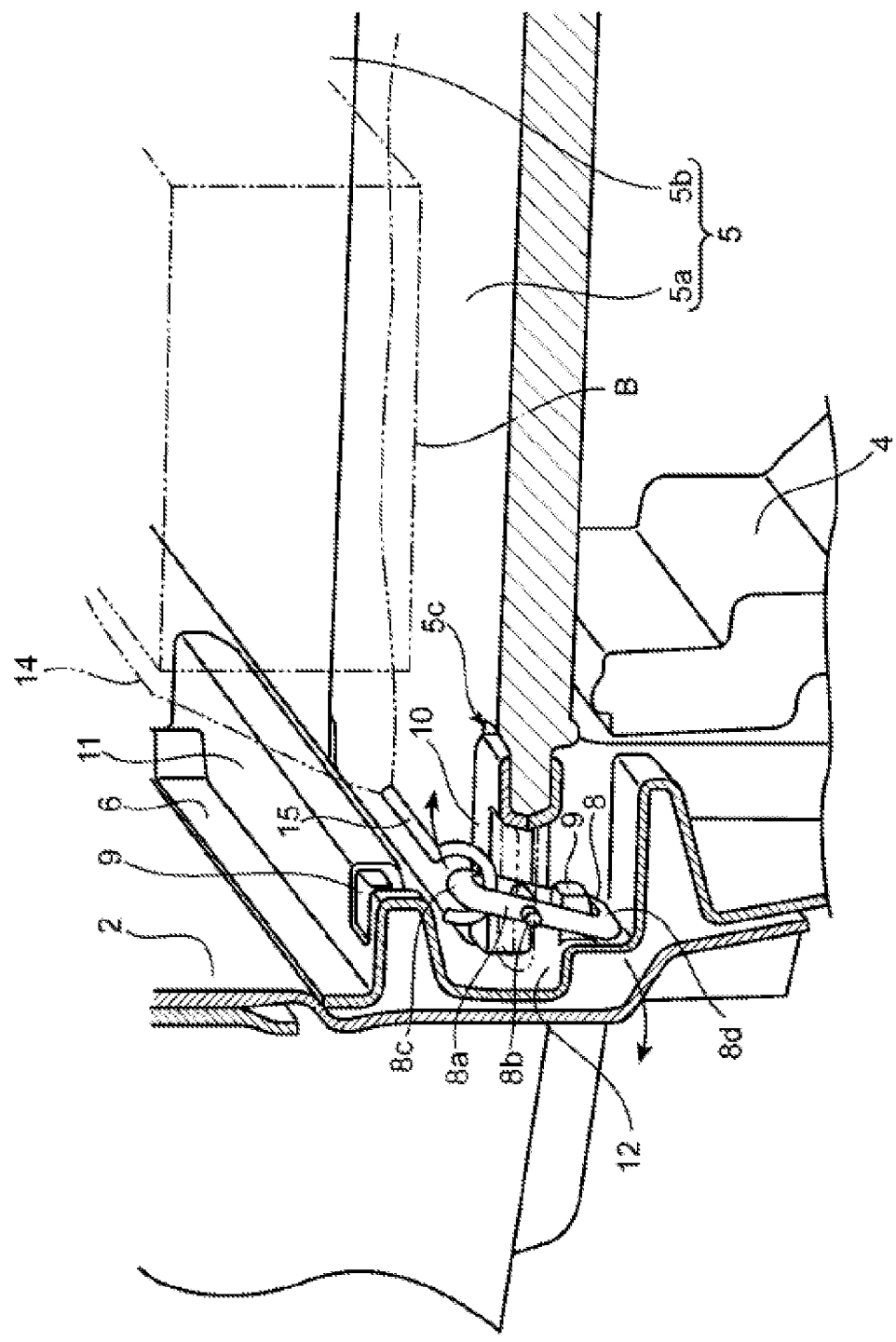
FIG. 6 is a perspective explanatory view illustrating an action in which a hook member provided to an opening at a side end of the trunk board in FIG. 1 engages with an engaged portion provided to the interior member.
Figure 7:
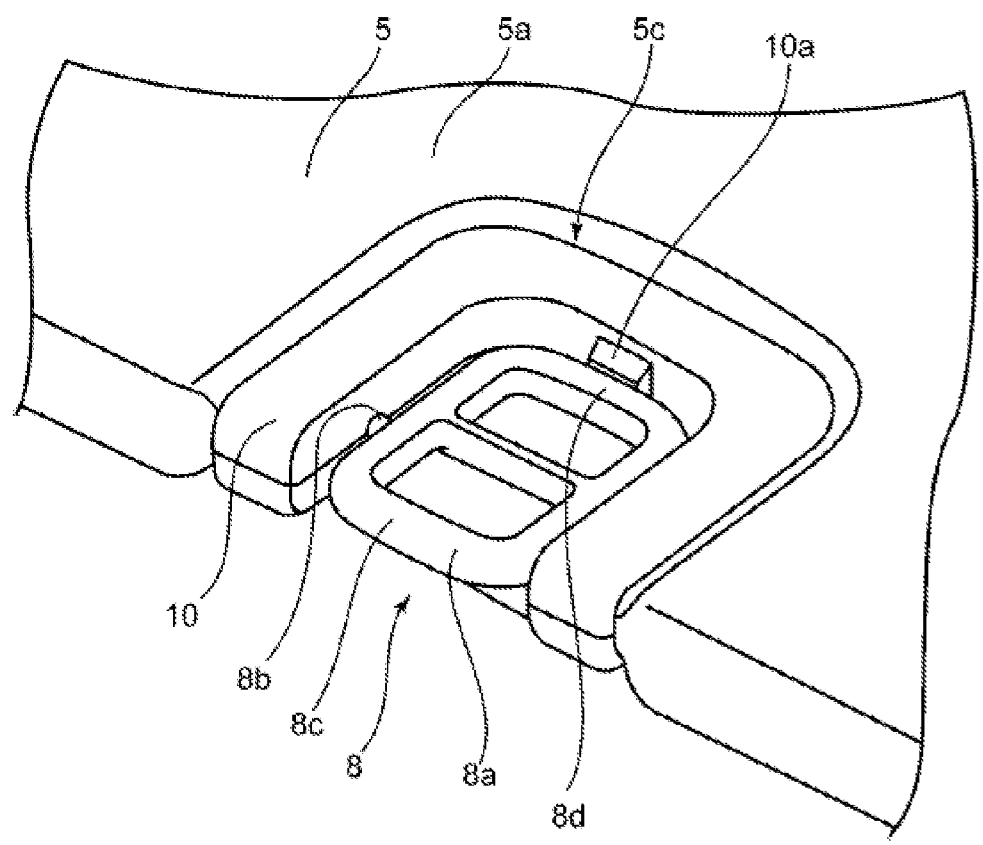
FIG. 7 is an enlarged perspective view illustrating a structure in which the hook member is provided to the opening at the side end of the trunk board in FIG. 1 via a frame member.

As illustrated in FIGS. 6 and 7, the hook member 8 is disposed in the internal portion of the opening 5c at each of both side ends of the trunk board 5 in the vehicle width direction Y and is rotatably attached to the trunk board 5 such that switching can be performed between an engaged state where the hook member 8 engages with the engaged portion 9 of the interior member 6 and a non-engaged state where the engagement is released.

The hook member 8 of the present embodiment has a rectangular annular body 8a and a rotation shaft 8b which rotatably supports the body 8a in an inner wall of the opening 5c of the trunk board 5.

The rotation shaft 8b extends in an in-plane direction of the trunk board 5 and in the vehicle front-rear direction X. Accordingly, the rectangular annular body 8a revolves around the rotation shaft 8b as a rotation center and is thereby capable of being switched between the non-engaged state where the rectangular annular body 8a is positioned on generally the same plane as the trunk board 5 and the engaged state where the rectangular annular body 8a projects from the front face 5f and the back face 5g of the trunk board 5.

The rectangular annular body 8a has a net locking portion 8c to which a cargo net 14 is locked and an engaging portion 8d which engages with the engaged portion 9 on the interior member 6 side. When seen in the non-engaged state where the rectangular annular body 8a is positioned on generally the same plane as the trunk board 5, the engaging portion 8d is made up of an inside portion of the body 8a in the vehicle width direction Y, and the net locking portion 8c is made up of an outside portion of the body 8a in the vehicle width direction Y.

As illustrated in FIG. 6, the hook member 8 configured as described above is disposed to be capable of being switched between the engaged state and the non-engaged state in the internal portion of the opening 5c of the trunk board 5 and projects from both faces of the front face 5f and the back face 5g of the trunk board 5 when transition is performed from the non-engaged state to the engaged state, and the engaging portion 8d projecting downward from the trunk board 5 is thereby capable of engaging with the engaged portion 9. Furthermore, the engaged state is retained when a hook 15 attached to a periphery of the cargo net 14 covering goods B is locked to the net locking portion 8c of the hook member 8, and movement of the trunk board 5 in the up-down direction Z is capable of being restrained.

Meanwhile, in a case where the cargo net 14 is not used, the state of the hook member 8 transits from the engaged state to the non-engaged state, the hook member 8 is thereby positioned on generally the same plane as the trunk board 5, and engagement with the engaged portion 9 is released. Accordingly, the trunk board 5 is not bound to the interior member 6, and changes in arrangement can freely be made such as flipping between front and back sides and changes in a height position.

Figure 8:
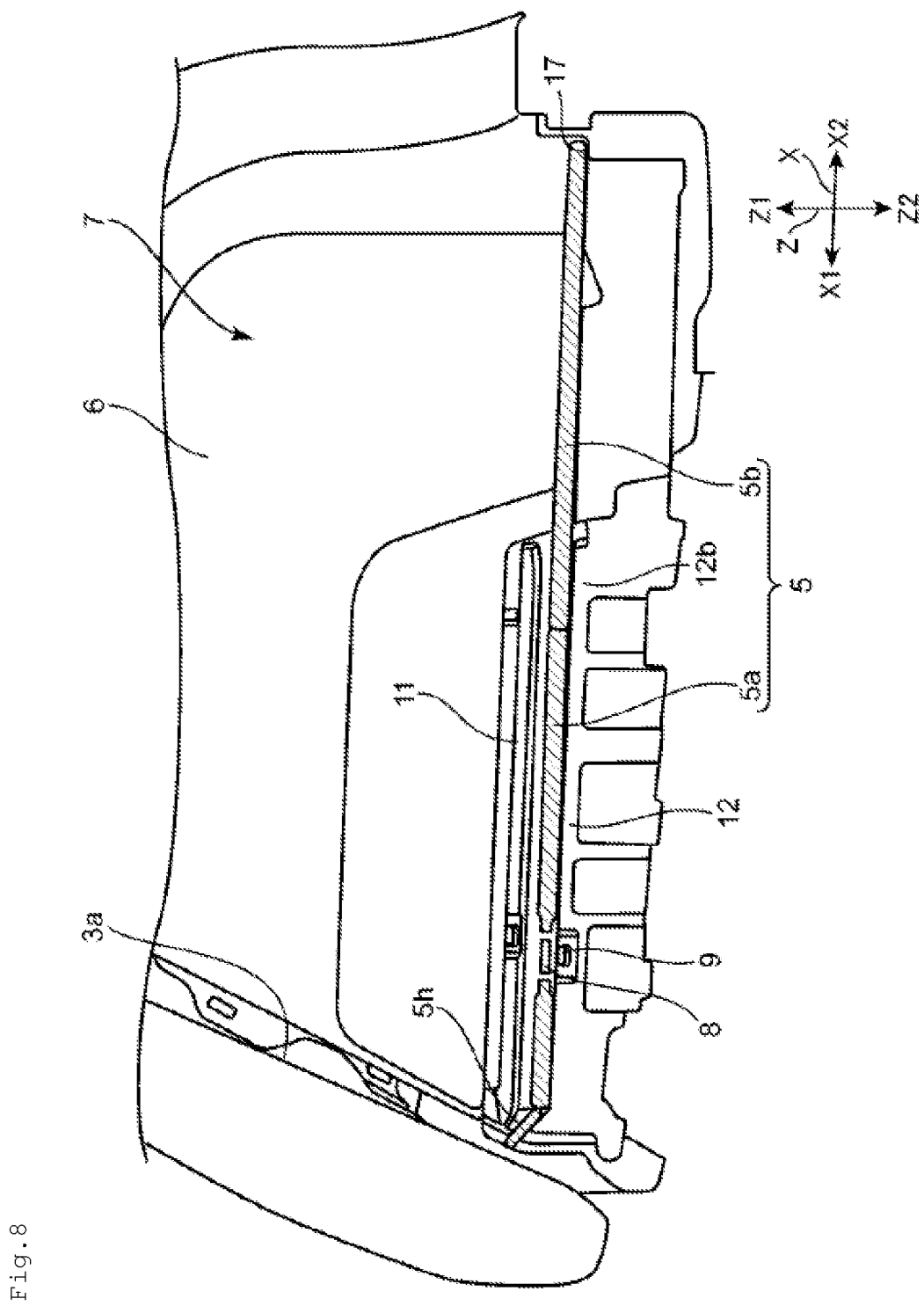
FIG. 8 is an explanatory view illustrating one example of a layout of the trunk board in the trunk structure in FIG. 1 and is a cross-sectional explanatory view illustrating a state where a front-side portion and a rear-side portion of the trunk board are disposed at the same height.

For example, as illustrated in FIG. 8, the front-side portion 5a of the trunk board 5 is supported by the second support portion 12 on the lower stage, and a state is thereby set where the front-side portion 5a and the rear-side portion 5b of the trunk board 5 are disposed at the same height. In this case, a portion of the rear-side portion 5b on the front side X1 is supported from below by a portion 12b of the second support portion 12 on the vehicle rear side X2, and a portion on the rear side X2 is supported from below by a lower side step portion 17 provided to a back end of the trunk 7. In a case where the trunk board 5 is disposed as illustrated in FIG. 8, it is possible to form a wide flat surface in the internal portion of the trunk 7 and possible to put large goods. In the disposition of the trunk board 5 which is illustrated in FIG. 8, the hook member 8 provided to the front-side portion 5a of the trunk board 5 engages with the engaged portion 9 of the second support portion 12 on the lower stage. When the hook 15 (see FIG. 6) of the cargo net 14 covering the goods is locked to the hook member 8, the engaged state between the hook member 8 and the engaged portion 9 is retained, and it is thereby possible to restrain movement of the front-side portion 5a of the trunk board 5 in the up-down direction Z.

Figure 9:
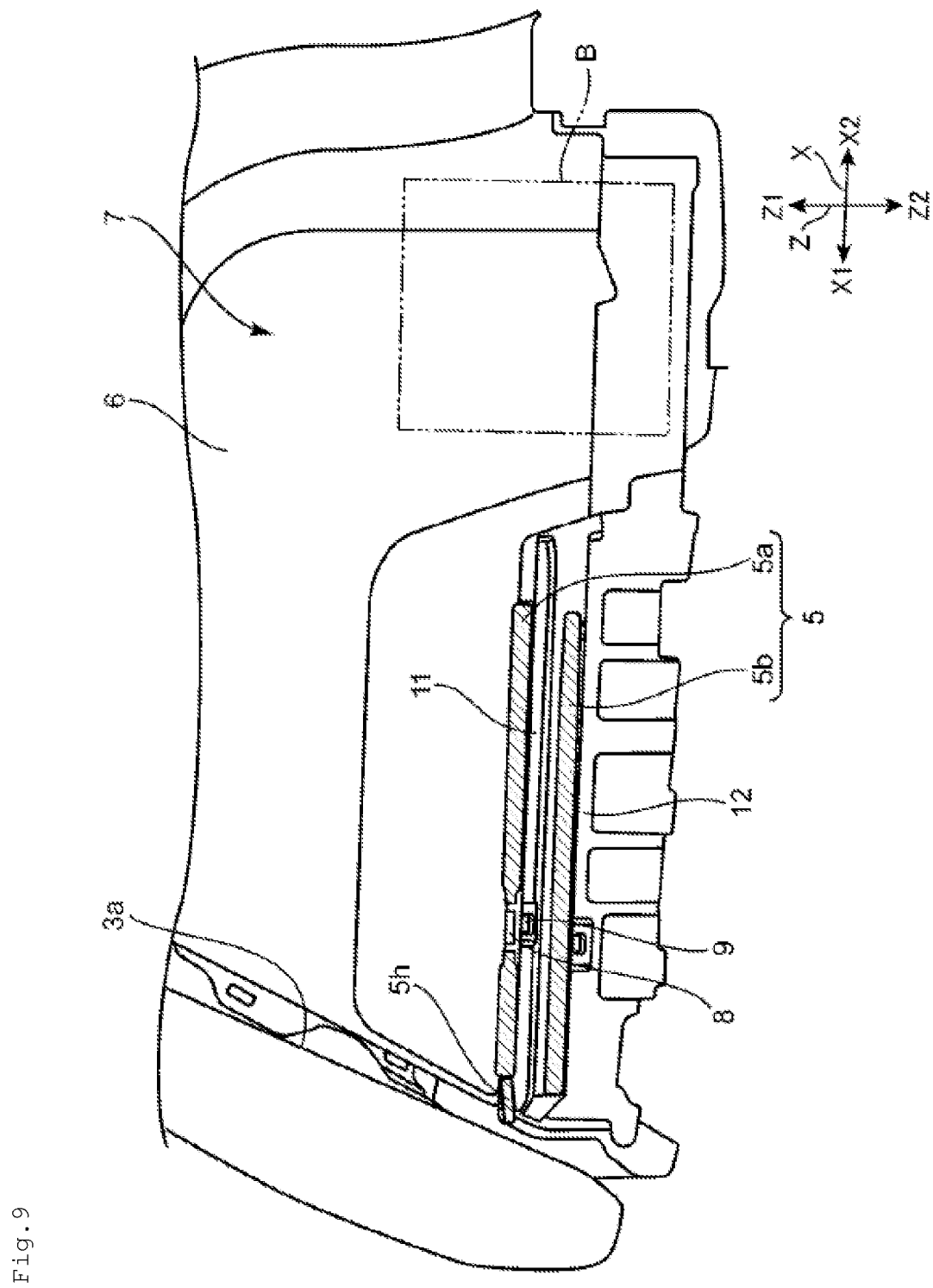
FIG. 9 is an explanatory view illustrating another example of the layout of the trunk board in the trunk structure in FIG. 1 and is a cross-sectional explanatory view illustrating a state where the front-side portion of the trunk board is disposed in the first support portion on an upper stage, the rear-side portion is disposed in the second support portion on a lower stage, and the front-side portion and the rear-side portion are stacked in an up-down direction.

Further, as illustrated in FIG. 9, a state is possible where the front-side portion 5a of the trunk board 5 is disposed in the first support portion 11 on the upper stage, the rear-side portion 5b is disposed in the second support portion 12 on the lower stage, and the front-side portion 5a and the rear-side portion 5b are stacked in the up-down direction Z in a position on the front side X1 in the trunk 7. In this case, a wide space in the up-down direction Z is secured on the rear side X2 in the trunk 7, and it is possible to put tall goods B. Note that in this case also, the hook member 8 of the front-side portion 5a is capable of engaging with the engaged portion 9 of the first support portion 11 on the upper stage. Thus, when other goods are put on the front-side portion 5a and are covered by the cargo net 14 and the hook 15 of the cargo net 14 is locked to the hook member 8, the engaged state between the hook member 8 and the engaged portion 9 is retained, and it is thereby possible to restrain movement of the front-side portion 5a of the trunk board 5 in the up-down direction Z.

Figure 10:
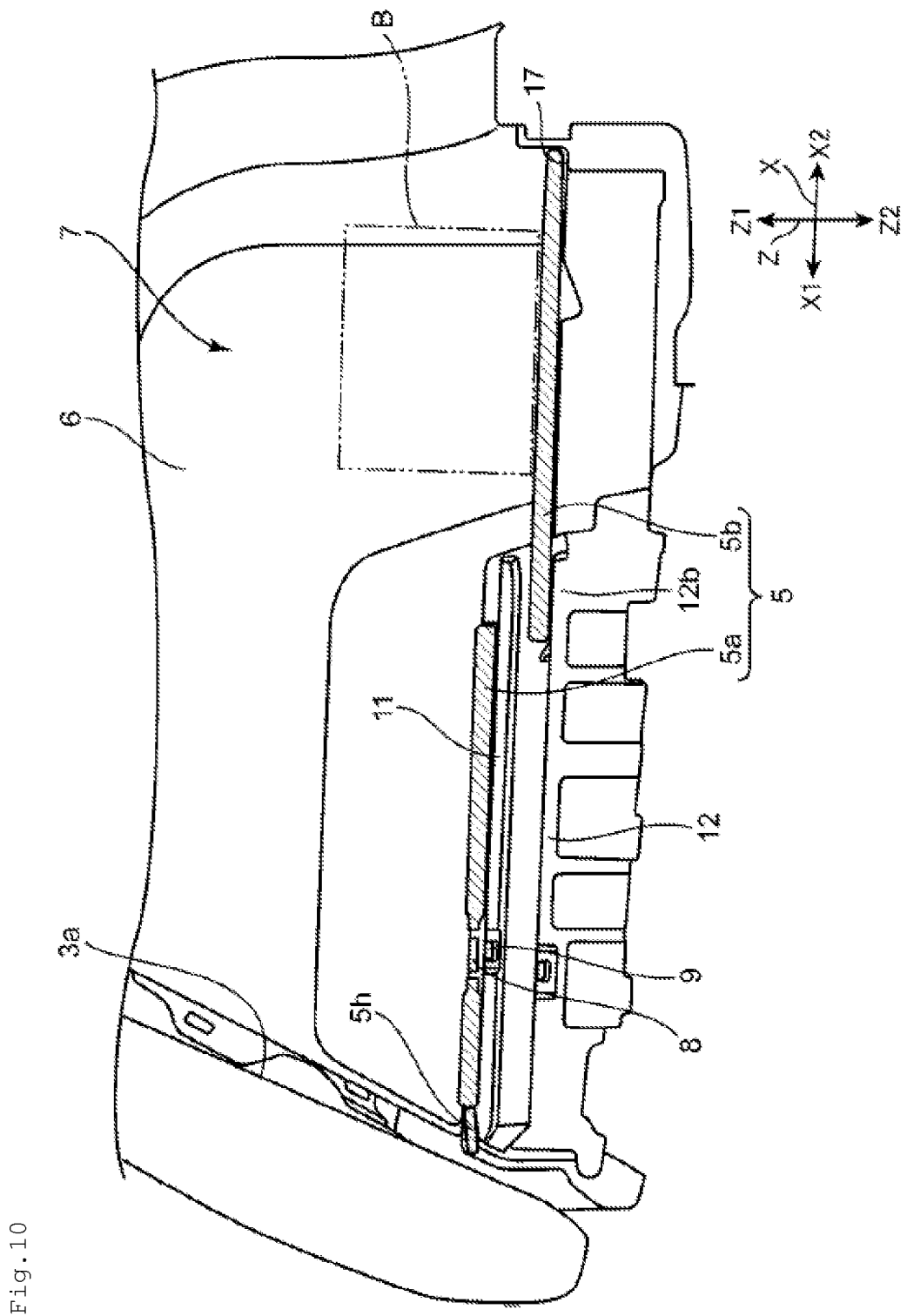
FIG. 10 is an explanatory view illustrating still another example of the layout of the trunk board in the trunk structure in FIG. 1 and is a cross-sectional explanatory view illustrating a state where the front-side portion of the trunk board is disposed in the first support portion on the upper stage, the rear-side portion is disposed on a vehicle rear side in the second support portion on the lower stage, and the front-side portion and the rear-side portion are stepwise disposed.

Further, as illustrated in FIG. 10, the front-side portion 5a of the trunk board 5 is disposed in the first support portion 11 on the upper stage, the rear-side portion 5b is disposed on the vehicle rear side X2 in the second support portion 12 on the lower stage, and the front-side portion 5a and the rear-side portion 5b may thereby be disposed stepwise. In this case, a portion of the rear-side portion 5b on the front side X1 is supported from below by a portion of the second support portion 12 on the vehicle rear side X2, and the portion on the rear side X2 is supported from below by the lower side step portion 17 provided to the back end of the trunk 7. In this case, because the rear-side portion 5b of the trunk board 5 is disposed in a slightly lower position than the front-side portion 5a, when the goods B are put on the rear-side portion 5b, the front-side portion 5a is capable of restraining movement of the goods B to the vehicle front X1.

Figure 11:
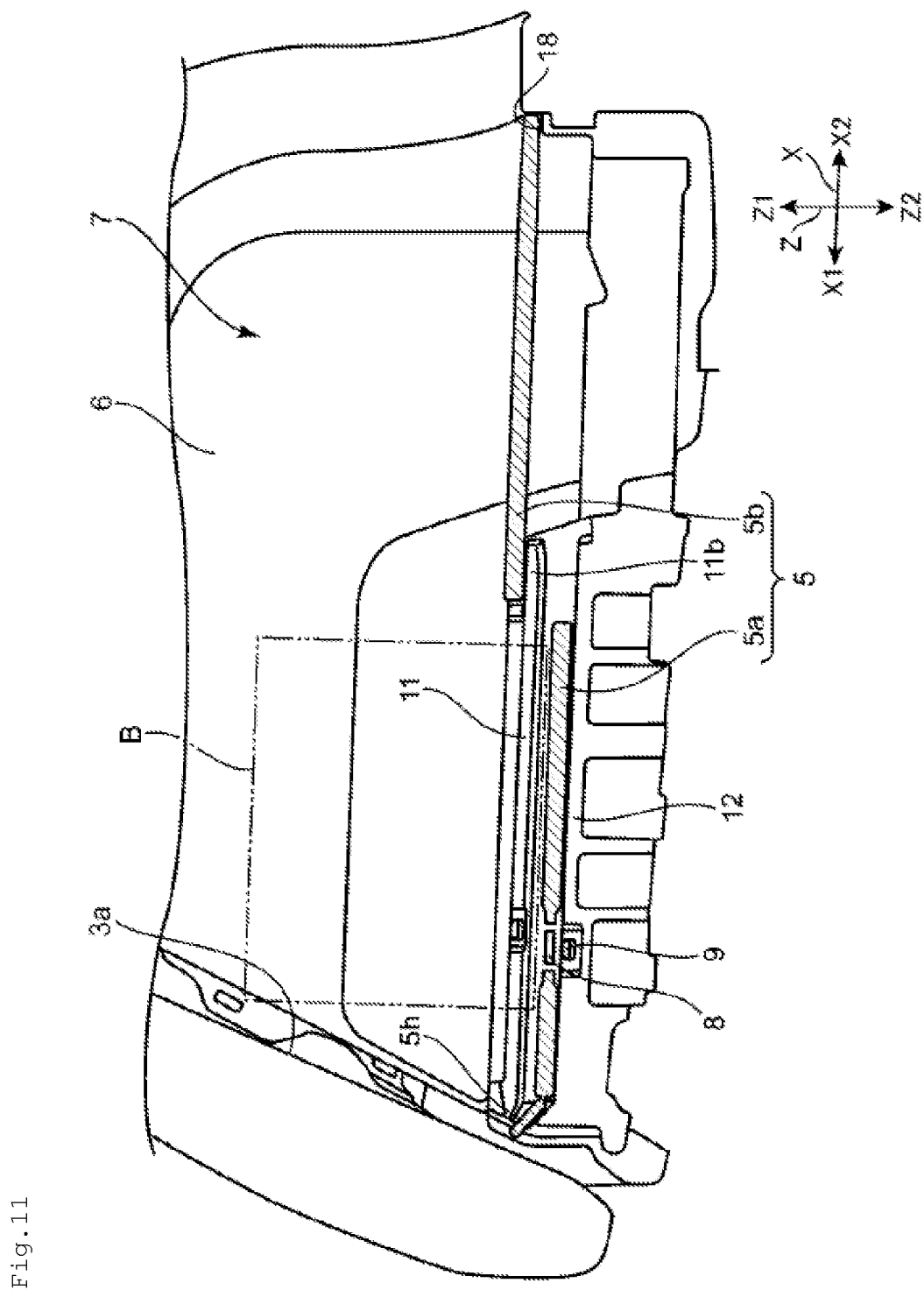
FIG. 11 is an explanatory view illustrating still another example of the layout of the trunk board in the trunk structure in FIG. 1 and is a cross-sectional explanatory view illustrating a state where the front-side portion of the trunk board is disposed in the second support portion on the lower stage, the rear-side portion is disposed on a vehicle rear side in the first support portion on the upper stage, and the front-side portion and the rear-side portion are stepwise disposed.

Further, as illustrated in FIG. 11, the front-side portion 5a of the trunk board 5 is disposed in the second support portion 12 on the lower stage, the rear-side portion 5b is disposed on the vehicle rear side X2 in the first support portion 11 on the upper stage, and the front-side portion 5a and the rear-side portion 5b may thereby be disposed stepwise. In this case, a portion of the rear-side portion 5b on the front side X1 is supported from below by a portion 11b of the first support portion 11 on the vehicle rear side X2, and a portion on the rear side X2 is supported from below by an upper side step portion 18 provided to the back end of the trunk 7. In this case, because the front-side portion 5a of the trunk board 5 is disposed in a slightly lower position than the rear-side portion 5b, when the goods B are put on the front-side portion 5a, the rear-side portion 5b is capable of restraining movement of the goods B to vehicle rear X2.

Figure 12:
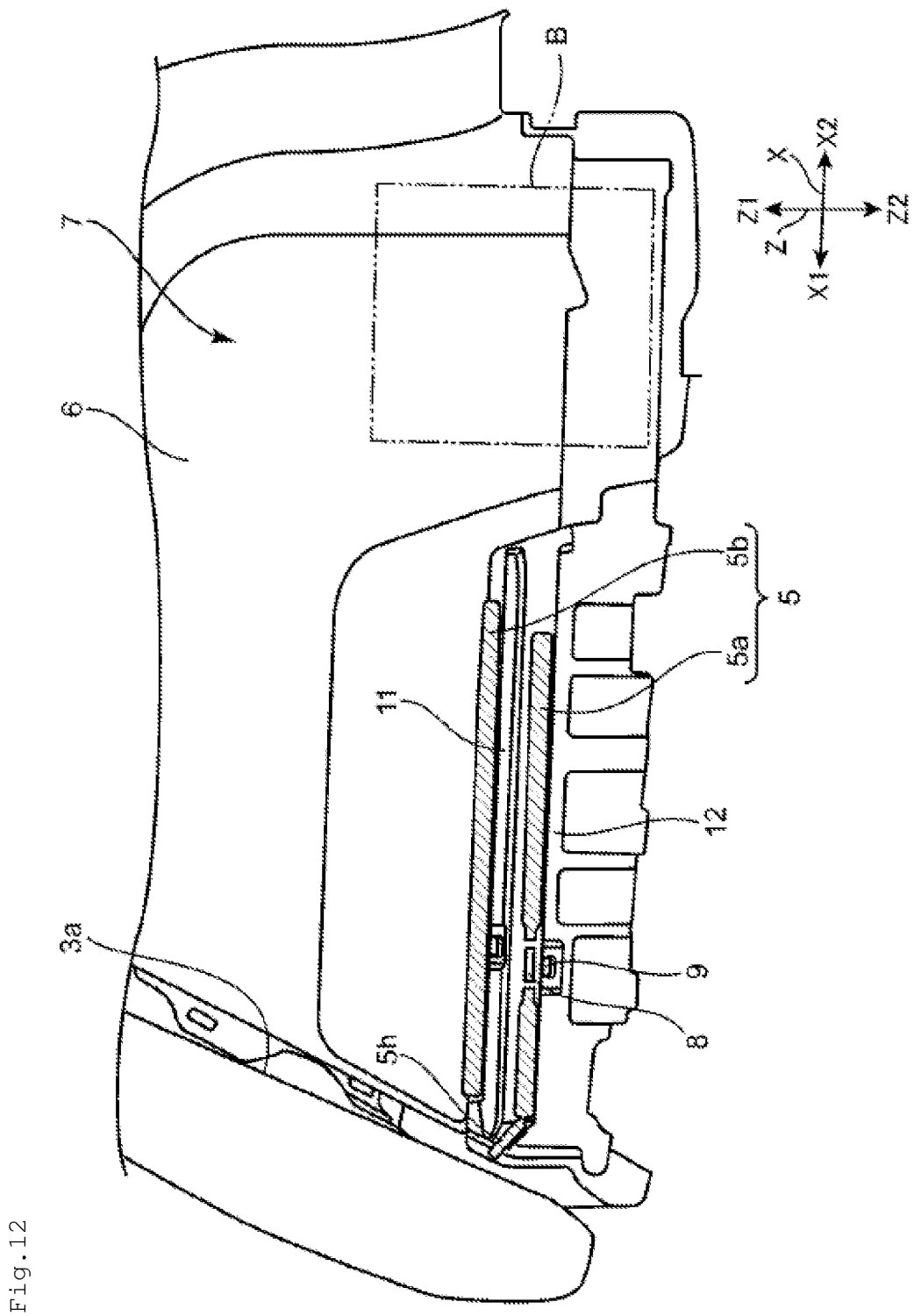
FIG. 12 is an explanatory view illustrating still another example of the layout of the trunk board in the trunk structure in FIG. 1 and is a cross-sectional explanatory view illustrating a state where the front-side portion of the trunk board is disposed in the second support portion on the lower stage, the rear-side portion is disposed in the first support portion on the upper stage, and the front-side portion and the rear-side portion are stacked in the up-down direction.

In addition, as illustrated in FIG. 12, a state is possible where the front-side portion 5a of the trunk board 5 is disposed in the second support portion 12 on the lower stage, the rear-side portion 5b is disposed in the first support portion 11 on the upper stage, and the front-side portion 5a and the rear-side portion 5b are stacked in the up-down direction Z in a position on the front side X1 in the trunk 7. In this case also, similarly to above FIG. 9, a wide space in the up-down direction Z is secured on the rear side X2 in the trunk 7, and it is possible to put tall goods B.

Characteristics of the Present Embodiment (1)

As illustrated in FIG. 1 and FIGS. 6 to 7, the trunk structure for the vehicle 1 of the present embodiment includes the trunk board 5 which is disposed above the floor panel 4 constituting the floor surface of the trunk 7 and on which goods are capable of being mounted, the hook member 8 which is attached to the trunk board 5 and which enables the cargo net 14 covering the goods to be locked to the hook member 8, the interior member 6 which constitutes the inside surface of the trunk 7, and the engaged portion 9 which is provided to the interior member 6 and with which the hook member 8 is capable of engaging, the engaged portion 9 restraining movement of the trunk board 5 in the up-down direction Z in a state where the engaged portion 9 is engaged with the hook member 8.

As illustrated in FIG. 6, the hook member 8 is capable of being switched between the engaged state where the hook member 8 engages with the engaged portion 9 and the non-engaged state where the engagement is released. The hook member 8 retains the engaged state by locking the cargo net 14 to the hook member 8.

With such a configuration, the hook member 8 attached to the trunk board 5 is capable of being switched between the engaged state and the non-engaged state with the engaged portion 9 which is provided to the interior member 6 constituting the inside surface of the trunk 7. The cargo net 14 covering the goods is locked to the hook member 8, and the hook member 8 thereby retains the engaged state. This engaged state is retained, and it is thereby possible to restrain movement of the trunk board 5 in the up-down direction Z. In this configuration, because a state is set where both the trunk board 5 and the goods are fixed to the interior member 6 by the hook member 8, it is possible to inhibit the goods and the trunk board 5 from moving due to vibration in traveling of the vehicle 1.

Further, the trunk board 5 is not bound to the interior member 6 in the non-engaged state where engagement between the hook member 8 and the engaged portion 9 is released, and changes in arrangement can freely be made such as flipping between front and back sides and changes in the height position as illustrated in FIGS. 8 to 12. Thus, it is possible to improve flexibility of layout of the trunk board 5 which conforms with a purpose of use of the trunk 7. In other words, as for the trunk structure of the present embodiment, even in the trunk structure where the goods are fixed by the cargo net 14, as in the following (2) to (5), a structure of the hook member 8 on the trunk board 5 side with respect to the engaged portion 9 on the interior member 6 side, a disposition of the engaged portion 9 on the interior member 6 side, or the like is optimized, and an improvement in flexibility of layout of the trunk board 5 is thereby ensured.

(2)

In the trunk structure for the vehicle 1 of the present embodiment, the hook member 8 has the net locking portion 8c to which the cargo net 14 is locked and the engaging portion 8d which engages with the engaged portion 9 on the interior member 6 side.

With such a configuration, the hook member 8 retains the engaged state when transition is performed to the engaged state where the engaging portion 8d engages with the engaged portion 9 and the cargo net 14 covering the goods is locked to the net locking portion 8c of the hook member 8 and is thereby capable of restraining movement of the trunk board 5 in the up-down direction Z.

(3)

The trunk structure for the vehicle 1 of the present embodiment further includes the first support portion 11 which supports the trunk board 5 and the second support portion 12 which supports the trunk board 5 in a position below the first support portion 11, the first support portion 11 and the second support portion 12 being provided to the interior member 6. The engaged portion 9 is provided to each of the first support portion 11 and the second support portion 12.

With such a configuration, even in a state where the trunk board 5 is supported by either one of the first support portion 11 and the second support portion 12, it is possible to engage the hook member 8 on the trunk board 5 side with the engaged portion 9 and possible to fix the trunk board 5 and the goods to the interior member 6.

(4)

In the trunk structure for the vehicle 1 of the present embodiment, the opening 5c which passes through the trunk board 5 from the front face 5f to the back face 5g is formed in the trunk board 5. The hook member 8 is disposed to be capable of being switched between the engaged state and the non-engaged state in the internal portion of the opening 5c, projects from both faces of the front face 5f and the back face 5g of the trunk board 5 in the engaged state, and is capable of engaging with the engaged portion 9 by a portion projecting from the trunk board 5.

With such a configuration, in the internal portion of the opening 5c which passes through the trunk board 5 from the front face 5f to the back face 5g, the hook member 8 is attached to be capable of being switched between the engaged state and the non-engaged state. The hook member 8 projects from both faces of the front face 5f and the back face 5g of the trunk board 5 in the engaged state and is capable of engaging with the engaged portion 9 by the portion projecting from the trunk board 5. Accordingly, even when the trunk board 5 is used while either one of the front face 5f and the back face 5g is directed upward, it is possible to lock the cargo net 14 to the hook member 8 from an upper side of the trunk board 5. As a result, it is possible to use both of the front and back faces of the trunk board 5.

(5)

In the trunk structure for the vehicle 1 of the present embodiment, the hook member 8 is capable of being switched between the engaged state and the non-engaged state by being rotatably attached to the trunk board 5.

With such a configuration, the hook member 8 is rotatably attached to the trunk board 5 and is capable of being switched between the engaged state and the non-engaged state by rotation of the hook member 8. Consequently, a configuration of a support portion for the hook member 8 becomes simple, and it is possible to easily perform an operation to switch the state of the hook member 8 between the non-engaged state and the engaged state.

(6)

Note that the hook member 8 is preferably attached to the trunk board 5 such that transition is performed from the non-engaged state to the engaged state when the cargo net 14 is locked. In this case, because the state of the hook member 8 transits from the non-engaged state to the engaged state when the cargo net 14 is locked, a manual operation for performing transition of the state of the hook member 8 from the non-engaged state to the engaged state is not necessary.

Modifications (A)

In the above embodiment, the engaged portion 9 is made up of the projection which projects from the inside surface of the interior member 6 toward the vehicle center in the vehicle width direction Y; however, the engaged portion of the present disclosure is not limited to this. As a modification of the trunk structure of the present disclosure, as illustrated in FIG. 13, in a case where a projection 8e is provided as an engaging portion in a position on an opposite side to the net locking portion 8c in the hook member 8 on the trunk board 5 side, an engaged portion on the interior member 6 side may be formed with an engaging hole 16 capable of fitting to the projection 8e.

Figure 13:
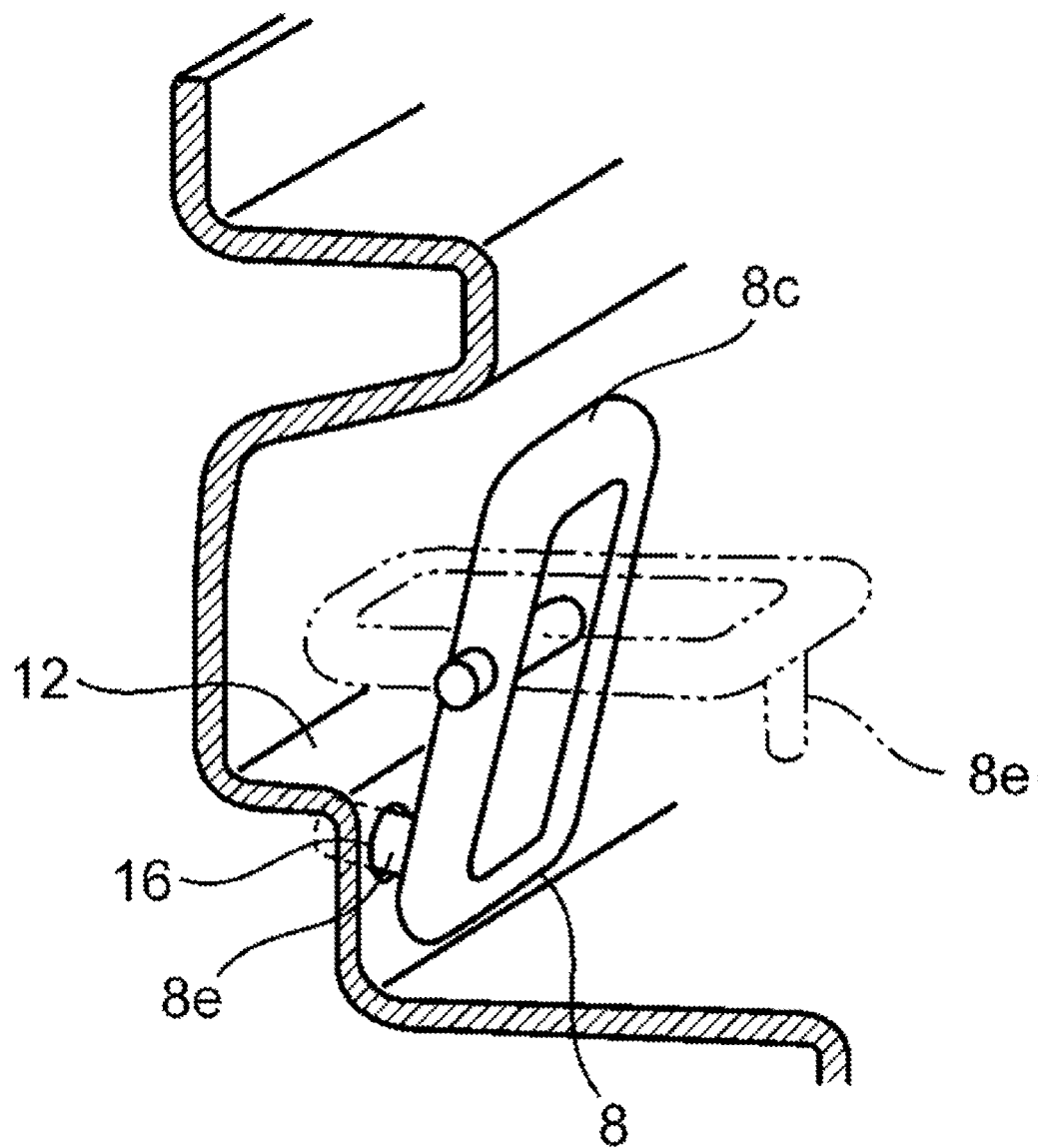
FIG. 13 is a perspective explanatory view illustrating a configuration in which the hook member on the trunk board side has a projection and an engaged portion on the interior member side is made up of an engaging hole capable of fitting to the projection, as a modification of the trunk structure for a vehicle of the present disclosure.

In the configuration illustrated in FIG. 13 also, the hook member 8 is capable of being switched between an engaged state where the projection 8e engages with the engaging hole 16 as the engaged portion formed in the interior member 6 and a non-engaged state where the engagement is released. The hook member 8 retains the engaged state when transition is performed from the non-engaged state to the engaged state and the hook 15 of the cargo net 14 covering the goods is locked to the net locking portion 8c of the hook member 8 and is thereby capable of restraining movement of the trunk board 5 in the up-down direction Z.

(B)

In the above embodiment, as one example of the trunk structure of the present disclosure, a structure in the trunk 7 provided on the rear side X2 of the rear seat 3 of the vehicle 1 is described; however, the present disclosure is not limited to this, and the present disclosure is capable of being applied to a trunk in another place in the vehicle 1. Consequently, the trunk structure of the present disclosure is capable of being applied also to a case of a vehicle such as an electric automobile where a trunk is provided to a vehicle body front portion.

What is claimed is:

1. A trunk structure for a vehicle, comprising:
    a trunk board disposed above a floor panel constituting a floor surface of a trunk and on which goods are capable of being mounted;
    a hook member attached to the trunk board and to which a cargo net covering the goods is capable of being locked;
    an interior member which constitutes an inside surface of the trunk; and
    an engaged portion provided to the interior member and with which the hook member is capable of engaging, the engaged portion restraining movement of the trunk board in an up-down direction in a state where the engaged portion is engaged with the hook member;
    wherein the hook member is capable of being switched between an engaged state where the hook member engages with the engaged portion and a non-engaged state where the engagement is released and retains the engaged state by locking the cargo net to the hook member.

2. The trunk structure for a vehicle according to claim 1, wherein
    the hook member has a net locking portion to which the cargo net is locked and an engaging portion which engages with the engaged portion on a side of the interior member.

3. The trunk structure for a vehicle according to claim 2, wherein
    the interior member includes a first support portion which supports the trunk board and a second support portion which supports the trunk board in a position below the first support portion, and
    each of the first support portion and the second support portion has one of the engaged portion.

4. The trunk structure for a vehicle according to claim 3, wherein
    an opening which passes through the trunk board from a front face to a back face is formed in the trunk board, and
    the hook member is disposed to be capable of being switched between the engaged state and the non-engaged state in an internal portion of the opening, projects from both faces of the front face and the back face of the trunk board in the engaged state, and is capable of engaging with the engaged portion by a portion projecting from the trunk board.

5. The trunk structure for a vehicle according to claim 4, wherein
    the hook member is capable of being switched between the engaged state and the non-engaged state by being rotatably attached to the trunk board.

6. The trunk structure for a vehicle according to claim 5, wherein
    the hook member is attached to the trunk board such that transition is performed from the non-engaged state to the engaged state when the cargo net is locked.

7. The trunk structure for a vehicle according to claim 1, wherein
    the interior member includes a first support portion which supports the trunk board and a second support portion which supports the trunk board in a position below the first support portion, and
    each of the first support portion and the second support portion has one of the engaged portion.

8. The trunk structure for a vehicle according to claim 1, wherein
    an opening which passes through the trunk board from a front face to a back face is formed in the trunk board, and
    the hook member is disposed to be capable of being switched between the engaged state and the non-engaged state in an internal portion of the opening, projects from both faces of the front face and the back face of the trunk board in the engaged state, and is capable of engaging with the engaged portion by a portion projecting from the trunk board.

9. The trunk structure for a vehicle according to claim 1, wherein
    the hook member is capable of being switched between the engaged state and the non-engaged state by being rotatably attached to on the trunk board.

10. The trunk structure for a vehicle according to claim 1, wherein
    the hook member is attached to the trunk board such that transition is performed from the non-engaged state to the engaged state when the cargo net is locked.

11. The trunk structure for a vehicle according to claim 2, wherein
    an opening which passes through the trunk board from a front face to a back face is formed in the trunk board, and
    the hook member is disposed to be capable of being switched between the engaged state and the non-engaged state in an internal portion of the opening, projects from both faces of the front face and the back face of the trunk board in the engaged state, and is capable of engaging with the engaged portion by a portion projecting from the trunk board.

12. The trunk structure for a vehicle according to claim 2, wherein
    the hook member is capable of being switched between the engaged state and the non-engaged state by being rotatably attached to on the trunk board.

13. The trunk structure for a vehicle according to claim 2, wherein
    the hook member is attached to the trunk board such that transition is performed from the non-engaged state to the engaged state when the cargo net is locked.

14. The trunk structure for a vehicle according to claim 3, wherein
    the hook member is capable of being switched between the engaged state and the non-engaged state by being rotatably attached to on the trunk board.

15. The trunk structure for a vehicle according to claim 3, wherein
    the hook member is attached to the trunk board such that transition is performed from the non-engaged state to the engaged state when the cargo net is locked.

16. The trunk structure for a vehicle according to claim 4, wherein
    the hook member is attached to the trunk board such that transition is performed from the non-engaged state to the engaged state when the cargo net is locked.

* * * * *